United States Patent
Shimizu

(10) Patent No.: US 7,038,990 B2
(45) Date of Patent: May 2, 2006

(54) METHOD FOR OPTICALLY RECORDING INFORMATION

(75) Inventor: Akihiko Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 235 days.

(21) Appl. No.: 10/777,746

(22) Filed: Feb. 13, 2004

(65) Prior Publication Data

US 2004/0190385 A1    Sep. 30, 2004

Related U.S. Application Data

(63) Continuation of application No. 10/071,199, filed on Feb. 11, 2002, now Pat. No. 6,714,230.

(30) Foreign Application Priority Data

Feb. 14, 2001    (JP) .............................. 2001-036395

(51) Int. Cl.
*G11B 7/00* (2006.01)

(52) U.S. Cl. ................................. 369/59.11

(58) Field of Classification Search ............... 369/59.1, 369/59.11, 59.14, 59.24, 120
See application file for complete search history.

(56) References Cited

U.S. PATENT DOCUMENTS 4,939,717 A    7/1990    Ohno et al.
5,420,837 A    5/1995    Saito et al.
5,673,249 A    9/1997    Hasegawa et al.
5,745,467 A    4/1998    Sakaue et al.

FOREIGN PATENT DOCUMENTS

| JP | 3-238624 | 10/1991 |
|----|----------|---------|
| JP | 8-147695 | 6/1996 |
| JP | 8-147698 | 6/1996 |
| JP | 11-25456 | 1/1999 |

*Primary Examiner*—Nabil Hindi
(74) *Attorney, Agent, or Firm*—Dickstein Shapiro Morin & Oshinsky LLP

(57) ABSTRACT

A method for optically recording information on an optically re-writable information medium is described. A mark is formed on a recording medium by radiating a laser light having the strength of the short recording pulse signal followed by the off-pulse signal. The recording film is heated to form the mark and the mark is extended by thermal diffusion while the off-pulse signal is provided. Therefore, the length of the recorded mark ML is longer than the recording pulse width at a predetermined linear velocity. The erasing pulse signal follows the off-pulse signal and the extended recorded mark is erased by the erasing pulse signal. The recording method according to the present invention can form a mark on the recording medium by radiating the laser light having a shorter recording pulse width than a recording pulse width used in the conventional method to form a mark having the same length.

17 Claims, 11 Drawing Sheets

FIG.23

| MARK LEVEL | OCCUPIED MARK RATIO | OCCUPIED MARK RATIO DIFFERENCE $\Delta L$ |
|---|---|---|
| 1.00 | 0.00 | – |
| 0.91 | 0.04 | 0.04 |
| 0.83 | 0.09 | 0.06 |
| 0.74 | 0.19 | 0.09 |
| 0.66 | 0.32 | 0.13 |
| 0.57 | 0.49 | 0.17 |
| 0.49 | 0.70 | 0.21 |
| 0.40 | 0.95 | 0.25 |

FIG.24

| MARK LEVEL | OCCUPIED MARK RATIO | OCCUPIED MARK RATIO DIFFERENCE $\Delta L$ |
|---|---|---|
| 1.00 | 0.00 | – |
| 0.80 | 0.12 | 0.12 |
| 0.73 | 0.20 | 0.08 |
| 0.67 | 0.30 | 0.10 |
| 0.60 | 0.43 | 0.13 |
| 0.53 | 0.58 | 0.15 |
| 0.47 | 0.76 | 0.17 |
| 0.40 | 0.95 | 0.20 |

FIG.25

| OCCUPIED MARK RATIO | MARK LEVEL | SIGNAL ⊿S |
|---|---|---|
| 0.00 | 1.00 | – |
| 0.14 | 0.82 | 0.18 |
| 0.29 | 0.69 | 0.13 |
| 0.43 | 0.59 | 0.10 |
| 0.57 | 0.51 | 0.08 |
| 0.71 | 0.45 | 0.06 |
| 0.86 | 0.42 | 0.03 |
| 1.00 | 0.41 | 0.01 |

FIG.26

| OCCUPIED MARK RATIO | MARK LEVEL | SIGNAL ⊿S |
|---|---|---|
| 0.00 | 1.00 | – |
| 0.12 | 0.85 | 0.15 |
| 0.23 | 0.74 | 0.11 |
| 0.35 | 0.64 | 0.09 |
| 0.47 | 0.57 | 0.08 |
| 0.58 | 0.50 | 0.06 |
| 0.70 | 0.46 | 0.05 |
| 1.00 | 0.41 | 0.05 |

METHOD FOR OPTICALLY RECORDING INFORMATION

This application is a continuation of application Ser. No. 10/071,199, filed on Feb. 11, 2002 now U.S. Pat. No. 6,714,230, which is incorporated herein by reference.

BACKGROUND OF THE INVENTION

1. Field of the Invention

The present invention generally relates to a method for optically recording information and more particularly a method for optically recording information in which a multi level signal is recorded on a track.

2. Description of the Related Art

The Japanese Laid-Open Patent Application No.8-147695 (a prior art method ①) discloses such kind of technology. In the prior art method ①, although the power of a laser diode is not decided in an ALPC zone, the laser diode is driven by a simple low bandwidth drive circuit with a multiple level drive current. First, the laser diode is driven on a trial basis in a Test Zone or a Manufacturer Zone, which zones are placed at an inside and an outside of an optical disc, and each zone has more than 100 tracks. In these zones, first, the laser diode is driven by the drive circuit having a current level of Iw0. Next, the laser diode is driven by the drive circuit having a current level of Iw1. Then, the laser diode is driven by the drive circuit having a current level of Iw2. Then, each current level of Iw0, Iw1 and Iw2 is optimally determined for predetermined power levels, respectively. When information is written on the disc in a write mode, first, a w0 D/A converter is supplied with data for the current value Iw0, a w1 D/A converter is supplied with data for the current value Iw1 and a w2 D/A converter is supplied with data for the current value Iw2. Then, switches SW4, SW5 and SW6 are turned on or turned off according to the data to be written. As a result, the laser diode LD1 is supplied with the LD drive current.

The Japanese Laid-Open Patent Application No. 11-25456 (a prior art method ②) also discloses such kind of technology. The prior art method ② discloses a simple method for recording multi level information on an optical information medium in order to raise recording density. In the prior art method ②, initially, first pits are formed on a re-writable media (a phase change optical disc) by radiating a laser light. Then, second pits are formed on the first pits by erasing parts of the first pits according to a multi leveled signal of the information to be recorded. Sizes of the second pits are modulated according to the multi level information.

FIG. 1 shows an example of a waveform of a recording pulse signal according to the prior art method ① as described above. The waveform of the recording pulse signal is composed of a rectangular recording pulse and an erasing pulse. A means for adjusting the size of a recorded mark controls the width of the recording pulse (T3–T1 as shown in FIG. 1) or strength of a light (Pw as shown in FIG. 1). On reproducing the recorded marks, strength of a reflected light by the mark is varied according to the size of the recorded mark. Therefore, a multi level signal, which is converted from the light reflected and has one of MARK signal levels corresponding to the size of the recorded mark, can be obtained as shown in FIG. 2. FIG. 2 shows a principle of such multi level recording method using a recorded mark size modulation.

A disadvantage of this method using the waveform of the recording pulse signal composed of the rectangular recording pulse and the erasing pulse is that the recorded mark is apt to be enlarged in the radial direction because of thermal diffusion caused by the laser beam focused on the optical information medium. Therefore, the shape of the recorded mark is apt to have a shape like a drop of water as shown in FIG. 1. Therefore, this method can not control the influence of the thermal diffusion on the size of the recorded mark if the size of the mark smaller than the size of the focused laser beam spot is formed.

FIG. 3 shows a relation between an occupied mark ratio and a multi level mark signal level according to the prior art method ①. As shown in FIG. 3, at a region ① in which the mark signal level is relatively high, a ratio of the mark signal level variation to the occupied mark ratio variation is high compared to that at a region ② in which the mark signal level is relatively low. Therefore, there is a need to control the occupied mark ratio more precisely at the region ① than at the region ②. However, the prior art method ① as shown in FIG. 1 cannot control the occupied mark ratio accurately because it cannot control the influence of the thermal diffusion to the size of the recorded mark. Therefore, the prior art method ① cannot control each level of the multi level signal accurately.

FIG. 5 shows the prior art method ②. To eliminate the disadvantage of the prior art method ①, it is possible to use a recording pulse signal composed of multi pulses as shown in FIG. 5. In this prior art method ②, the recording pulse is composed of a start pulse, short multi pulses and an erasing pulse. As the short multi pulses are used, the enlargement of the recorded mark in the radial direction caused by thermal diffusion can be prevented. A means for adjusting the size of the recorded mark controls the width of the first pulse (T2–T1 as shown in FIG. 5), the duty of the multi pulses (T4–T3 as shown in FIG. 5), or strength of the first pulse and the multi pulses (Pw as shown in FIG. 5).

There is a need to raise the frequency of the recording pulses to form the recorded marks having a size less than that of the focused laser beam spot. Therefore, a recording pulse generation circuit and a laser diode need to be operated at a high frequency in order to record the information on the optical information medium at a high speed. However, it is hard to raise their operating frequencies. Further, the recording pulse generation circuit becomes complex.

SUMMARY OF THE INVENTION

It is a general object of the present invention to provide a method for optically recording information in which the above disadvantages are eliminated.

Further, it is another object of the present invention to provide a method for optically recording information in which recorded marks having a size less than that of a focused laser beam spot can be formed using a multi level signal recording method with a recording pulse having a simple waveform.

Further, it is another object of the present invention to provide a method for optically recording information in which the size of each recorded mark having a size less than that of a focused laser beam spot can be controlled to a desired size.

Further, it is another object of the present invention to provide a method for optically recording information in which a position of the recorded mark having a size less than that of a focused laser beam spot is controlled precisely by a simple method for controlling the recording pulse.

Further, it is another object of the present invention to provide a method for optically recording information in which a size of the recorded mark having the size less than that of a focused laser beam spot is fine-tuned accurately.

Further, it is another object of the present invention to provide a method for optically recording information in which the position of the recorded mark having a size less than that of a focused laser beam spot is fine-tuned accurately.

Further, it is another object of the present invention to provide a method for optically recording information in which each level of the multi level signal is recorded accurately.

The above objects of the present invention are achieved by a method for optically recording information on an optically re-writable information medium having at least one track, in which method a laser light is focused to a laser spot to form a mark on the optically re-writable information medium and the size of the mark is modulated according to a level of a multi-level signal which correspond to the information to be recorded, further in which method:

the strength of the laser light for recording each mark is modulated according to a waveform comprising a first rectangular erasing pulse signal, a rectangular recording pulse signal, an off-pulse signal and a second rectangular erasing pulse signal, the laser light having a strength set to a value indicated by the first rectangular erasing pulse signal can erase a recorded mark, the laser light having a strength set to a value indicated by the rectangular recording pulse signal can record a mark, the strength of the laser light set to a value indicated by the off-pulse signal is less than the strength of the laser light used in reproduction of the recorded marks, the laser light having a strength set to a value indicated by the second rectangular erasing pulse signal can erase the recorded mark, and a product of the time interval of the rectangular recording pulse signal and the relative linear velocity between the laser spot and the optically re-writable information medium is shorter than the length of the recorded mark.

According to the present invention, the mark is formed on a recording medium by radiating the laser light having the strength of the short recording pulse signal followed by the off-pulse signal. The recording film is heated to form the mark and the mark is extended by a thermal diffusion while the off-pulse signal is provided. Therefore, the length of the recorded mark ML is longer than the recording pulse width at the predetermined linear velocity. The erasing pulse signal follows the off-pulse signal and the extended recorded mark is erased by the erasing pulse signal.

The recording method according to the present invention can form a mark on the recording medium by radiating the laser light having a shorter recording pulse width than a recording pulse width used in the conventional method to form a mark having the same length. Therefore, heat quantity applied to the medium by the recording method according to the present invention is smaller than that of the conventional method. As a result, expansion of the mark in a direction perpendicular to the longitudinal direction of the track is reduced compared to the conventional methods.

The above objects of the present invention are achieved by a method for optically recording information on an optically re-writable information medium, wherein the size of the mark is modulated according to the information by means of modulating a pulse width of the off-pulse signal so that the time interval between a rising edge of the rectangular recording pulse signal and a rising edge of the rectangular erasing pulse signal corresponds to the size of the mark.

According to the present invention, a simple recording pulse signal generation circuit can be used for multi-level recording because the size of the mark is modulated according to the information by means of modulating only the pulse width of the off-pulse signal.

The above objects of the present invention are achieved by a method for optically recording information on an optically re-writable information medium, wherein the track is divided into a plurality of cells and the mark is recorded in the cell so that the center of the mark is placed at the center of the cell by means of adjusting both the rising edge of the rectangular recording pulse signal and the rising edge of the rectangular erasing pulse signal.

According to the invention, the center of the mark is precisely placed at the center of the cell by means of adjusting both the rising edge of the rectangular recording pulse signal and the rising edge of the rectangular erasing pulse signal because the effect of the thermal diffusion is effectively used.

The above objects of the present invention are achieved by a method for optically recording information on an optically re-writable information medium, wherein the size of the mark is fine-adjusted by controlling the timing of a falling edge of the rectangular recording pulse signal.

According to the invention, the size of the mark is fine-adjusted by controlling only the timing of the falling edge of the rectangular recording pulse signal because the effect of the thermal diffusion is effectively used.

The above objects of the present invention are achieved by a method for optically recording information on an optically re-writable information medium, wherein the size of the mark is fine-adjusted by controlling the strength of the laser light modulated by the rectangular recording pulse signal.

According to the present invention, the size of the mark is fine-adjusted by controlling only the strength of the laser light modulated by the rectangular recording pulse signal because the effect of the thermal diffusion is effectively used.

The above objects of the present invention are achieved by a method for optically recording information on an optically re-writable information medium, wherein the timing of the rising edge of the rectangular recording pulse signal is controlled so that the center of the mark is placed at the center of the cell.

According to the invention, the center of the mark is precisely placed at the center of the cell by only further shifting the rectangular recording pulse signal because the effect of the thermal diffusion is effectively used.

The above objects of the present invention are achieved by a method for optically recording information on an optically re-writable information medium, wherein the relation between the length (ML) of the mark along the track and a diameter (BD) of the laser spot satisfies $ML \leq BD$, and the product of the pulse width of the rectangular recording pulse signal and the relative linear velocity is less than 20% of the diameter (BD) of the laser spot.

According to the present invention, the width of the rectangular recording pulse signal is properly limited so that the mark can be recorded with higher precision.

The above objects of the present invention are achieved by a method for optically recording information on an optically re-writable information medium, wherein the relation between the length of a minimum mark (MLmin) along the track, except when there is no mark, and the diameter (BD) of the laser spot satisfies MLmin/BD≧0.10, and each level of the multi-level signal is assigned so that the level difference between adjacent levels becomes equidistant, except when there is no mark.

According to the present invention, the deviation from the aimed multi-level signal levels can be reduced.

The above objects of the present invention are achieved by a method for optically recording information on an optically re-writable information medium, wherein the relation between the length of a maximum mark (MLmax) along the track, except for a mark that has about the same length as a diameter of the laser spot, and the diameter (BD) of the laser spot satisfies MLmax/BD≦0.70, and each occupied mark ratio of the multi-level signal is assigned so that the difference between the occupied mark ratios corresponding to adjacent levels of the multi-level signal becomes equidistant, except for the mark that has about the same length as the diameter of the laser spot.

According to the present invention, the deviation from the aimed multi-level signal levels can be reduced.

BRIEF DESCRIPTION OF THE DRAWINGS

Other objects, features and advantages of the present invention will become more apparent from the following detailed description when read in conjunction with the accompanying drawings, in which:

FIG. 23 shows relation between the mark levels and the occupied mark ratios (ML/BD);

FIG. 24 shows the relation between the mark levels and the occupied mark ratios;

FIG. 25 shows the relation between the occupied mark ratios and the mark levels; and FIG. 26 shows the relation between the occupied mark ratio and the mark level difference ΔS.

DESCRIPTION OF THE PREFERRED EMBODIMENTS

Next, an embodiment according to the present invention will be explained with reference to accompanying figures.

1. Principle of Recording

Figure 6:
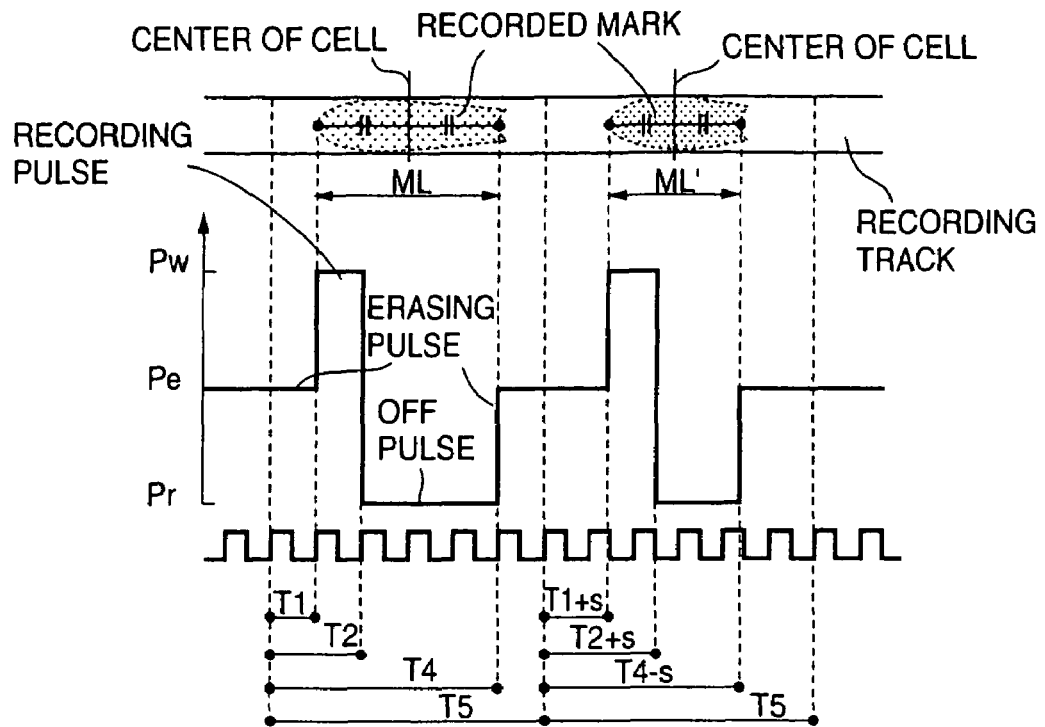
FIG. 6 shows an example of a basic waveform of a recording pulse signal according to an embodiment of the present invention.

FIG. 6 shows a waveform of a recording pulse signal according to the present invention. The waveform of the recording pulse signal, by means of which strength of a laser light supplied from a laser diode is modulated, consists of a first rectangular erasing pulse signal, a rectangular recording pulse signal, an off-pulse signal and a second rectangular erasing pulse signal, and these four kinds of pulse signals are repeated for each mark. The laser light having the strength that is set to a value indicated by the first rectangular erasing pulse signal can erase a recorded mark. The laser light having the strength that is set to a value indicated by the rectangular recording pulse signal can form a mark. The strength of the laser light used in reproduction of the recorded marks is set to a value less than the value of the rectangular recording pulse by means of the off-pulse signal. The laser light having the strength which is set to a value indicated by the second rectangular erasing pulse signal can erase a recorded mark. A track is divided into cells in a longitudinal direction. Each cell corresponds to a time interval T5 at a predetermined linear velocity as shown in FIG. 6. Length of a mark ML recorded in a cell along the track can be controlled by recording pulse width (T2−T1) and a start point of the erasing pulse signal T4. If the length of the mark to be recorded is changed, a time T1 and the time T4 are adjusted to record the mark at the center of the cell. For example, if the length of the recorded mark is changed from ML to ML', then T1 should also be changed to T1+s and T4 should also be changed to T4−s to record the mark at the center of the cell.

The mark ML is formed on a recording medium by radiating the laser light having the strength of the recording pulse signal during the time interval T2−T1. The recording film is heated to form the mark and the mark is extended by thermal diffusion while the off-pulse signal is provided. Therefore, the length of the recorded mark ML is longer than the recording pulse width at the predetermined linear velocity. The erasing pulse signal follows the off-pulse signal and the extended recorded mark is erased by the erasing pulse signal. As a result, the marks ML as shown in FIG. 6 are formed on the recording medium.

The recording method according to the present invention can form a mark on the recording medium by radiating the laser light having a shorter recording pulse width (T2−T1) than the recording pulse width used in the conventional method to form a mark having the same length. Therefore, heat quantity applied to the medium by the recording method according to the present invention is smaller than that of the conventional method. As a result, expansion of the mark in a direction perpendicular to the longitudinal direction of the track is reduced compared to the conventional methods. The present invention has such an advantage. Further, the size of the recorded mark can be controlled by means of changing the off-pulse width according to each level of a desired multi-level signal based on the principle of the present invention.

2. Controlling the Mark Width in a Direction Perpendicular to the Longitudinal Direction of the Track As described above, by limiting the effect of the thermal diffusion, it is possible to control the mark width in a direction perpendicular to the longitudinal direction of the track. The thermal quantity applied by the laser light radiated to the medium is controlled to limit the extension of the mark.

Figure 7:
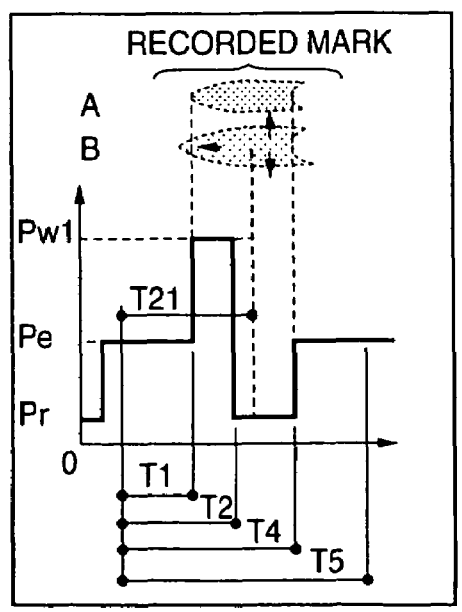
FIG. 7 shows a waveform of a recording pulse signal of a first method for controlling the width of a recorded mark in a direction perpendicular to a longitudinal direction of a track according to an embodiment of the present invention.

FIG. 7 through FIG. 10 show a method to control the mark width in a direction perpendicular to the longitudinal direction of the track. As shown in FIG. 7, the mark width is extended as the recording pulse width is extended from the time interval T2 to the time interval T21, where T21 is greater than T2. The mark A is recorded with a recording pulse T2 and the mark B is recorded with a recording pulse T21.

Figure 9:
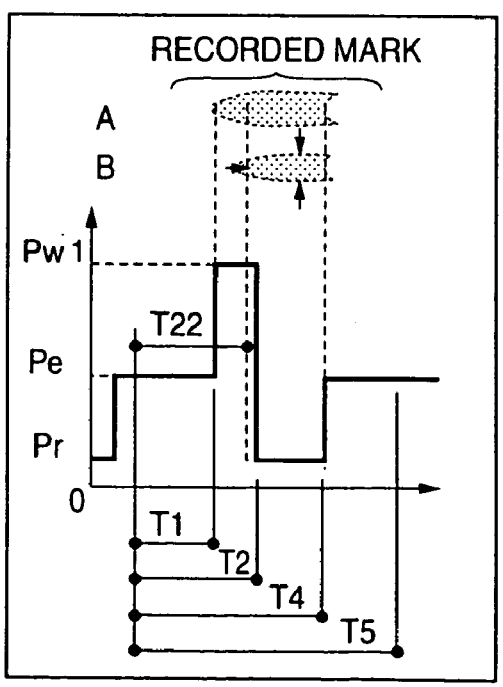
FIG. 9 shows a waveform of a recording pulse signal of a third method for controlling the width of a recorded mark in a direction perpendicular to the longitudinal direction of the track according to an embodiment of the present invention.

On the contrary, as shown in FIG. 9, the mark width is reduced as the recording pulse width is reduced from the time interval T2 to the time interval T22, where T22 is shorter than T2. The mark A is recorded with a recording pulse T2 and the mark B is recorded with a recording pulse T22.

Figure 8:
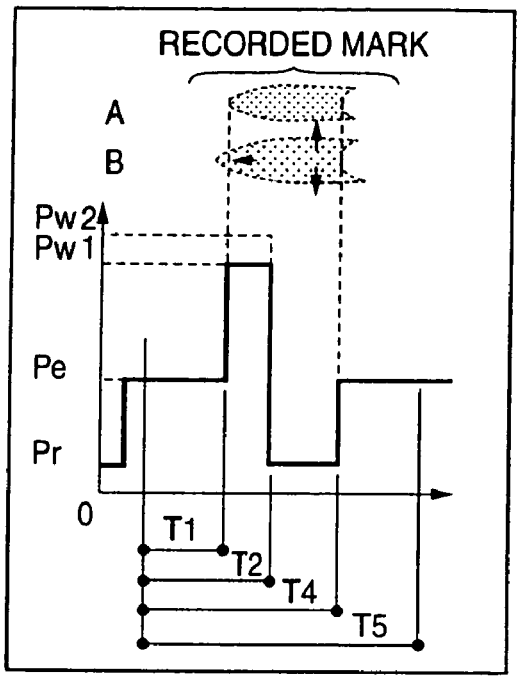
FIG. 8 shows a waveform of a recording pulse signal of a second method for controlling the width of a recorded mark in a direction perpendicular to the longitudinal direction of the track according to an embodiment of the present invention.

As shown in FIG. 8, the mark width is extended as the strength of the laser light is raised from PW1 to PW2, where PW2 is greater than PW1. The mark A is recorded with the laser light having the strength of PW1 and the mark B is recorded with the laser light having the strength of PW2.

Figure 10:
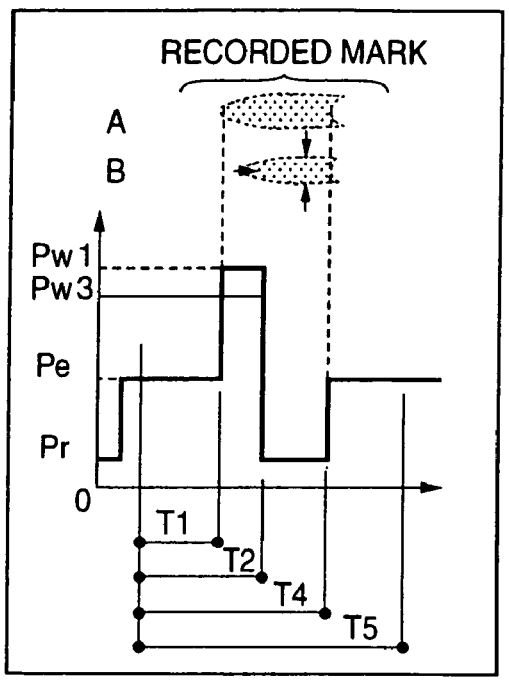
FIG. 10 shows a waveform of a recording pulse signal of a fourth method for controlling the width of a recorded mark in a direction perpendicular to the longitudinal direction of the track according to an embodiment of the present invention.

On the contrary, as shown in FIG. 10, the mark width is reduced as the strength of the laser light is reduced from PW1 to PW3, where PW3 is lower than PW1. The mark A is recorded with the laser light having the strength of PW1 and the mark B is recorded with the laser light having the strength of PW3.

3. Controlling the Position of the Recorded Mark

As described above, the thermal quantity applied by the laser light radiated to the medium is controlled to limit the extension of the mark in the direction perpendicular to the longitudinal direction of the track. As a result, the start point of the recording mark formed on the medium is also changed. Therefore, the relative position between the recorded mark and the center of the cell is changed.

Therefore, the mark position recorded along the track also needs to be controlled when the mark width is controlled. FIG. 11 through FIG. 14 shows several methods to control the start position for recording the mark.

Figure 11:
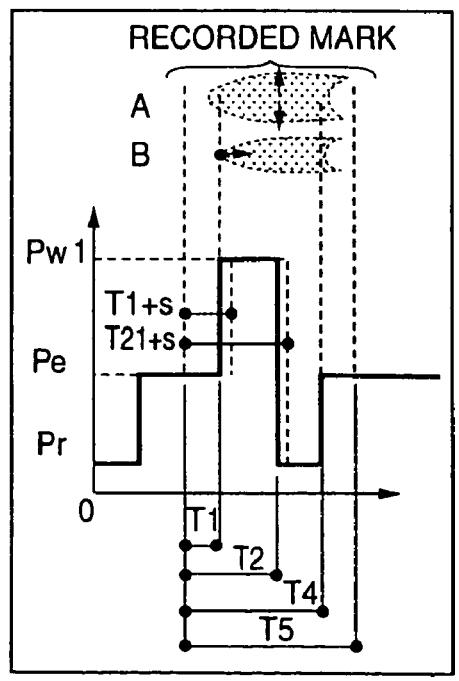
FIG. 11 shows a waveform of a recording pulse signal of a first method for controlling the start point of a recorded mark according to an embodiment of the present invention.

As shown in FIG. 11, the start point of the recording pulse signal is modified from T1 to T1−s and the end point of the recording pulse signal is modified from T21 to T21+s to correct a forward variation s of the start point without changing the pulse width T21−T1.

Figure 13:
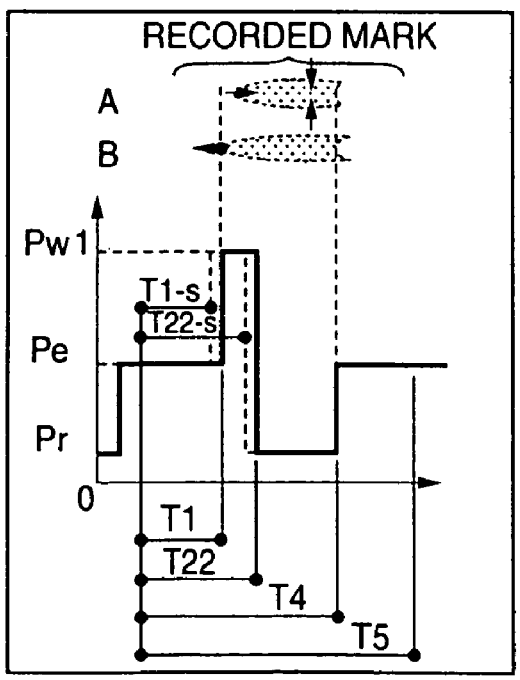
FIG. 13 shows a waveform of a recording pulse signal of a third method for controlling the start point of a recorded mark according to an embodiment of the present invention.

As shown in FIG. 13, the start point of the recording pulse signal is modified from T1 to T1−s and the end point of the recording pulse signal is modified from T22 to T22−s to correct a backward variation s of the start point without changing the pulse width T22−T1.

Figure 12:
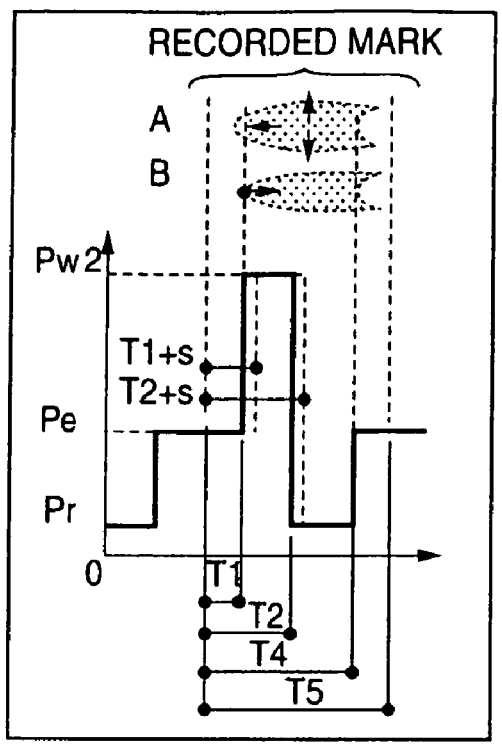
FIG. 12 shows a waveform of a recording pulse signal of a second method for controlling the start point of a recorded mark according to an embodiment of the present invention.

As shown in FIG. 12, the start point of the recording pulse signal is modified from T1 to T1+s and the end point of the recording pulse signal is modified from T2 to T2+s to correct a forward variation s of the start point without changing the pulse width T2−T1.

Figure 14:
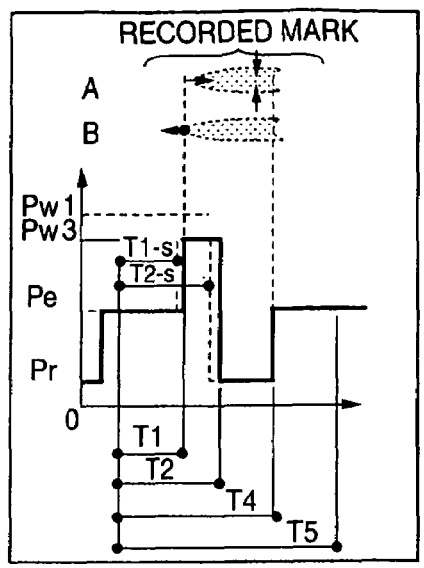
FIG. 14 shows a waveform of a recording pulse signal of a fourth method for controlling the start point of a recorded mark according to an embodiment of the present invention.

As shown in FIG. 14, the start point of the recording pulse signal is modified from T1 to T1−s and the end point of the recording pulse signal is modified from T2 to T2−s to correct a backward variation s of the start point without changing the pulse width T2−T1.

Figure 15:
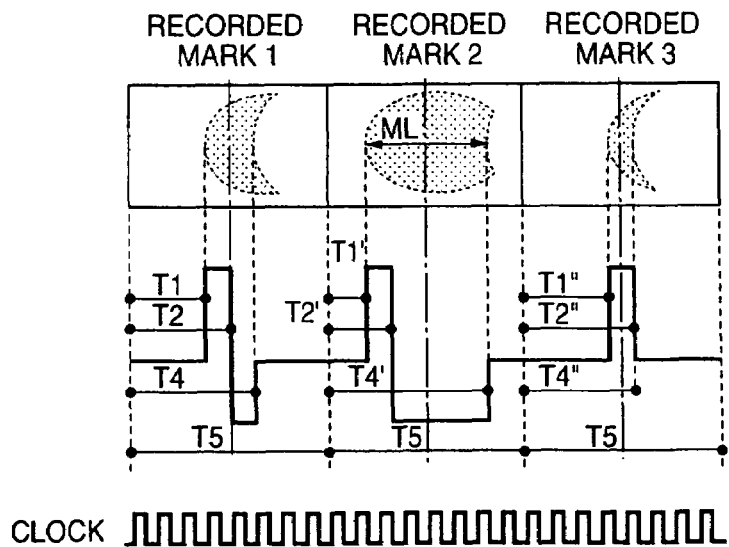
FIG. 15 shows relations between waveforms of recording pulse signals and recorded marks according to an embodiment of the present invention.

FIG. 15 shows relations between waveforms of recording pulse signals and recorded marks according to an embodiment of the present invention.

4. Embodiment ① of Recording and Reproduction

Figure 16:
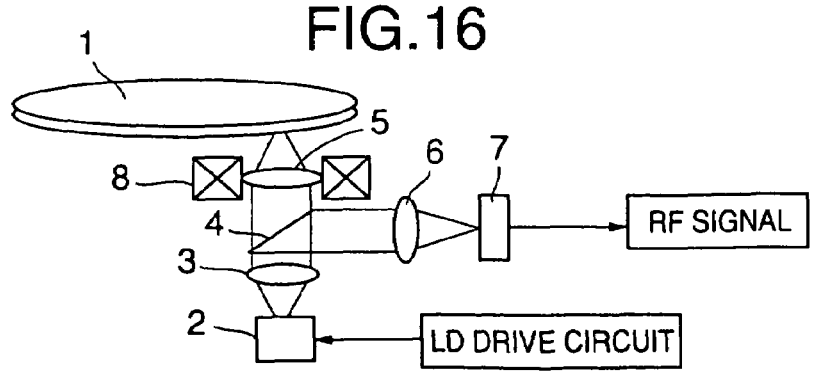
FIG. 16 shows a block diagram of an optical information recording apparatus according to an embodiment of the present invention.

FIG. 16 shows a block diagram of an optical information recording apparatus according to an embodiment of the present invention. In this embodiment ①, the information is recorded and reproduced on an optical recording medium 1 by the optical information recording apparatus. The optical information recording apparatus as shown in FIG. 16 has a spindle motor (not shown), a laser diode 2, a collimator lens 3, a polarizer 4, an objective lens 5, a detection lens 6, a quadrant photo detector 7 and actuators 8. The light radiated from the laser diode 2 is focused on the optical recording medium 1 through the collimator lens 3, the polarizer 4 and the objective lens 5, and then, the marks are recorded on the optical recording medium 1. The reflected light is polarized by the polarizer 4 and focused on the quadrant photo detector 7 through the detection lens 6. Then, an RF signal is detected by the quadrant photo detector 7. The actuators 8 control the position of the objective lens 5 both for focusing the laser spot on the medium and for moving the laser spot to follow the track. A wavelength λ of the laser for recording or reproduction is 650 nm and a numerical aperture NA is 0.65. As a result, the diameter of the laser beam spot is 0.8 μm. These parameters are commonly used in a typical re-writable DVD recording apparatus. The optical recording medium 1 is composed of a phase change material such as AgInSbTe, which is a re-writable type material. The marks are recorded on a groove track and a distance between the adjacent tracks, which is called a track pitch, is 0.74 μm and the track width is about 0.4 μm. Recording conditions are as follows. The recording power is 14 mW on the recording surface, the erasing power is 7.5 mW and the relative linear velocity between the groove track and the laser light spot is about 3.5 m/s. The length of the cell is about 0.7 μm along the groove track.

Figure 17:
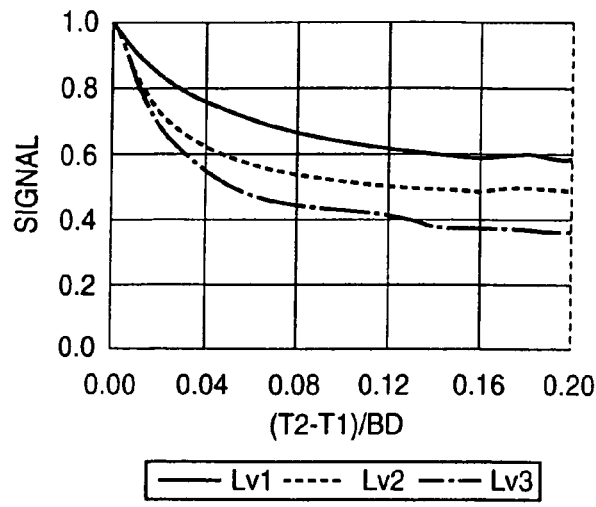
FIG. 17 shows a result of recording and reproducing information on a disc according to an embodiment of the present invention.

FIG. 17 shows a result of recording and reproducing information on the optical recording media 1 according to an embodiment of the present invention. In FIG. 17, the abscissa shows a ratio of a recording pulse width (T2−T1) to a beam spot diameter BD and the ordinate shows a sum signal that is called the RF signal. The RF signal is generated by means of opto-electrically converting a light reflected from the recorded mark to an electrical signal. The curve Lv1 in FIG. 17 shows a case when the rising edge T1 of the recording pulse signal and the falling edge T2 of the erasing pulse signal are adjusted so that the mark length of the recorded mark ML becomes 0.13 μm. The curve Lv2 in FIG. 17 shows a case when the rising edge T1 of the recording pulse signal and the falling edge T2 of the erasing pulse signal are adjusted so that the mark length of the recorded mark ML becomes 0.27 μm. The curve Lv3 in FIG. 17 shows a case when the rising edge T1 of the recording pulse signal and a the falling edge T2 of the erasing pulse signal are adjusted so that the mark length of the recorded mark ML becomes 0.40 μm.

FIG. 17 shows that the RF signal value (Mark signal level) for each curve is saturated at a range of the recording pulse width ratio (T2−T1)/BD between 0.16 to 0.20. This is because the maximum mark width in a direction perpendicular to the longitudinal direction of the track is limited to the groove track width.

These data mean that the RF signal level (Mark signal level) can be fine-adjusted as long as the recording pulse signal ratio of (T2−T1)/BD is kept less than 0.20.

5. Embodiment ② of Recording and Reproduction

This embodiment ② shows deviation values from aimed multi-level signal levels.

Figure 4:
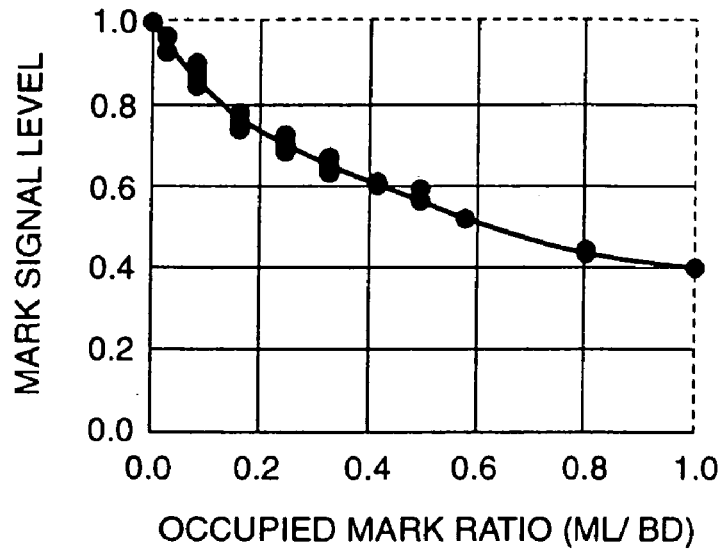
FIG. 4 shows measured deviation values from aimed multi-level signal levels according to the prior art method ①.
Figure 5:
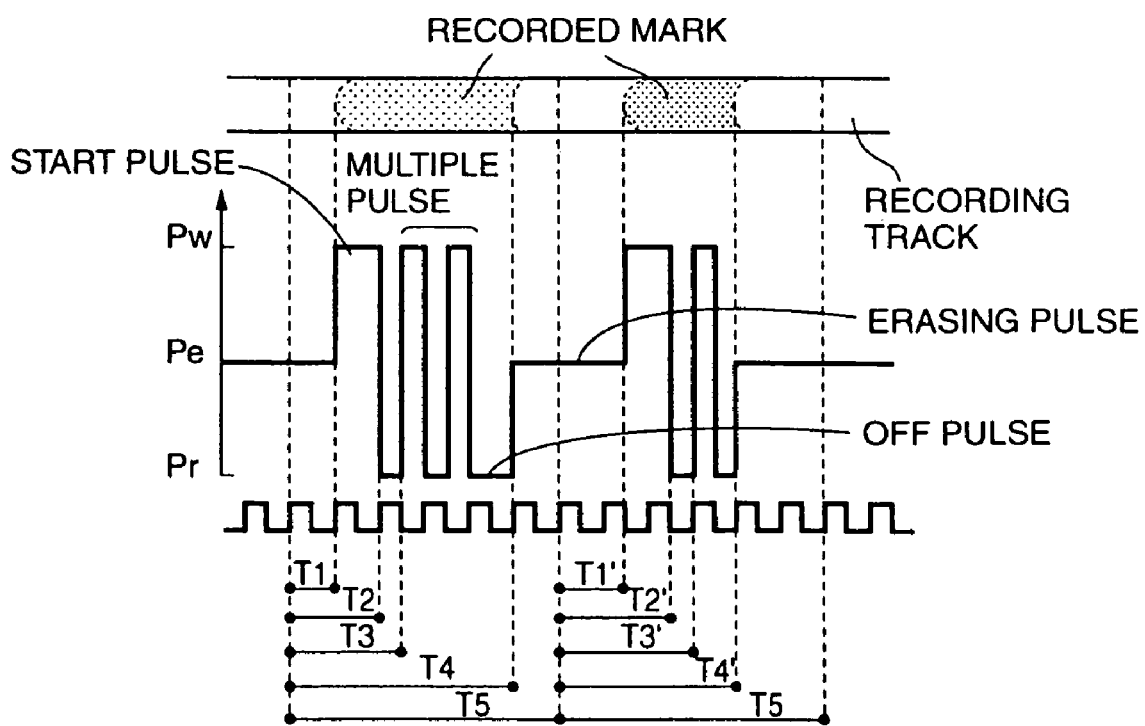
FIG. 5 shows an example of a waveform of a recording pulse signal according to the prior art method ②.
Figure 18:
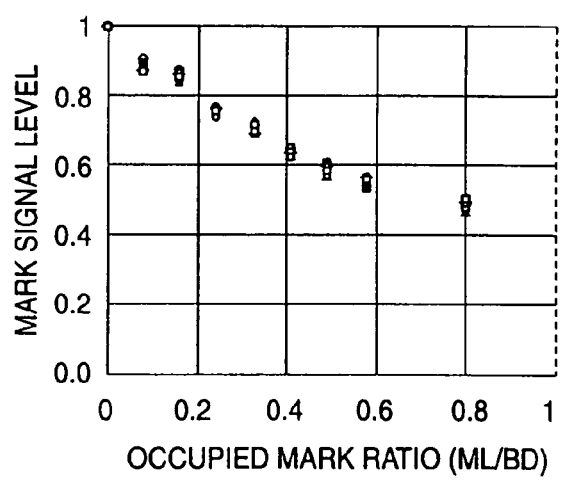
FIG. 18 shows measured deviation values from aimed multi-level signal levels according to an embodiment of the present invention.

FIG. 18 shows measured deviation values from aimed multi-level signal levels according to an embodiment ② of the present invention. On the other hand, FIG. 4 shows measured deviation values from aimed multi-level signal levels according to the prior art method ①. The recording condition used in this embodiment ② is the same condition as that used in the embodiment ①.

Figure 1:
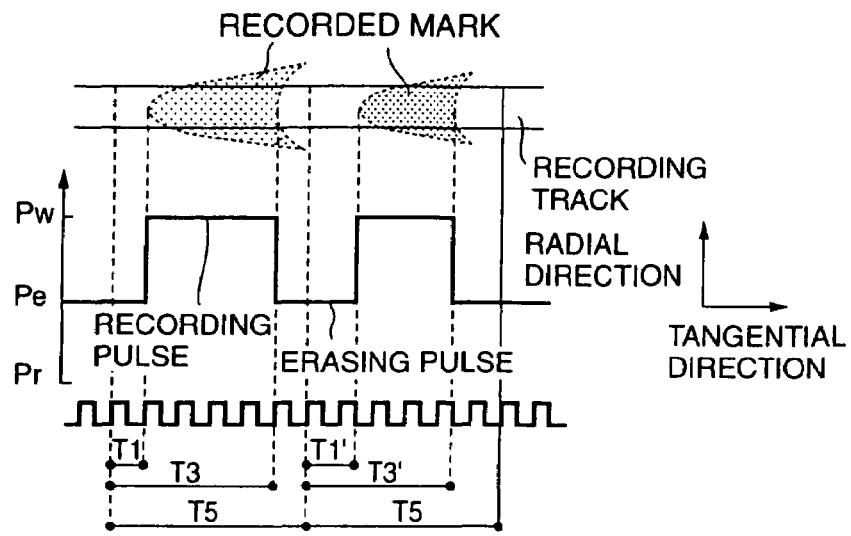
FIG. 1 shows an example of a waveform of a recording pulse signal according to the prior art method ①.
Figure 2:
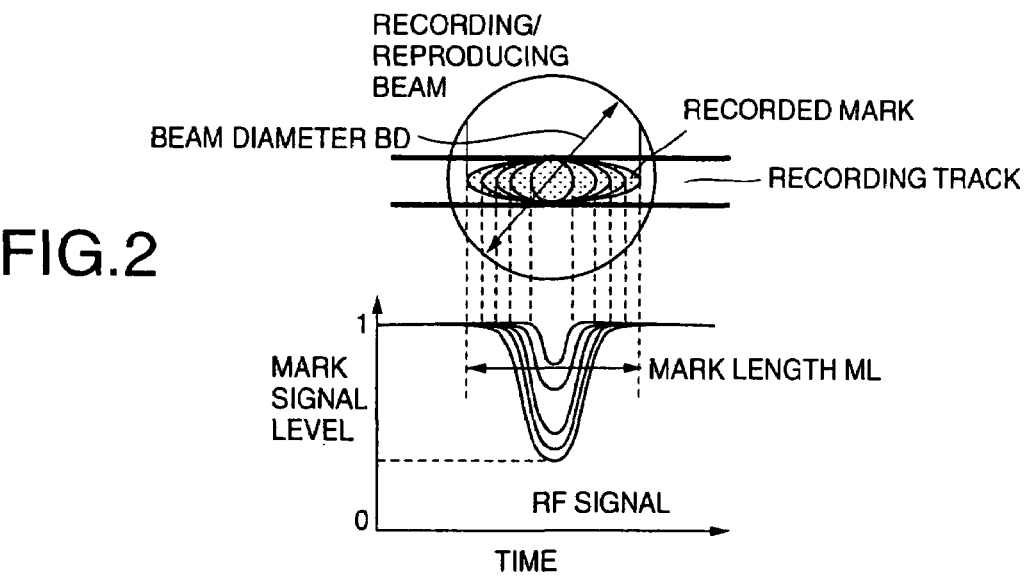
FIG. 2 shows a principle of a multi level recording method using a recorded mark size modulation according to the prior art.
Figure 3:
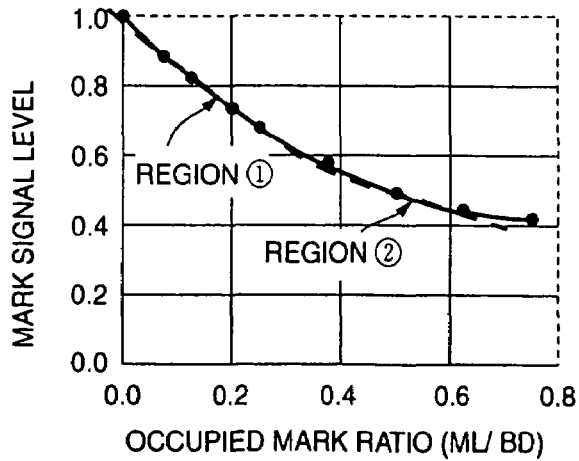
FIG. 3 shows a relation between an occupied MARK ratio and a MARK signal level according to the prior art method ①.

As described for the prior art methods, at the region ① as shown in FIG. 3 in which a mark signal level is relatively high, the mark signal level variation to the occupied mark ratio variation is high compared to that at the region ② in which a mark signal level is relatively low. In the prior art methods, the maximum deviation (σ) to the aimed multi-level signal level is about 8%.

On the contrary, the result from this embodiment ② shows that the maximum deviation (σ) to the aimed multi-level signal level at the region ① is about 2%. This means that the method according to the present invention is superior to the prior art methods.

6. Embodiment ③ for Determining Levels of a Multi-Level Signal

Figure 19:
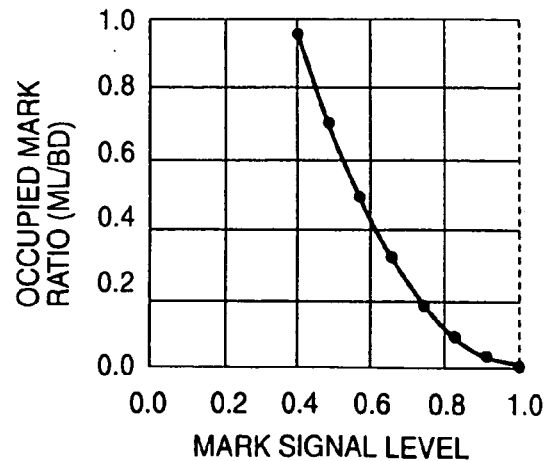
FIG. 19 shows a relation between a MARK signal level of a multi level RF signal and an occupied MARK ratio.
Figure 20:
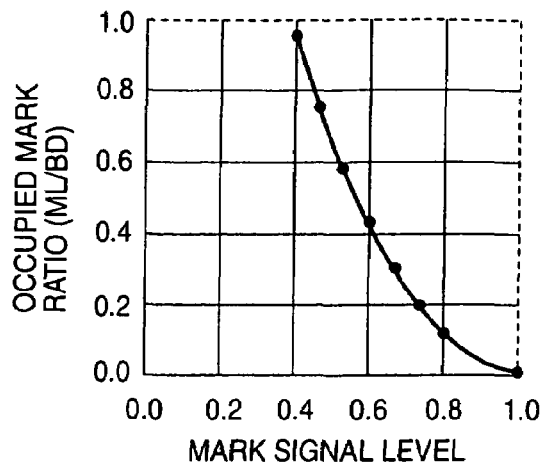
FIG. 20 shows a relation between a MARK signal level of a multi level RF signal and an occupied MARK ratio.

In the multi-level signal recording method in which a size of the recorded mark is changed according to the signal level, it is important to select a condition of the mark length, under which the mark is easily recorded in order to easily detect the multi-level RF signal correctly. FIG. 19 and FIG. 20 show the relation between the multi-level RF signal level (Mark signal level) and the occupied mark ratio. The abscissa shows the multi-level RF signal level (Mark signal level) and the ordinate shows the occupied mark ratio.

As shown in FIG. 19, a range of the mark signal level between 0.4 and 1.0 can be used to express the multi-level signal. The black dots show 8 multi-levels. The distances between the adjacent levels are equal to each other. FIG. 23 shows the relation between the mark levels and the occupied mark ratios (ML/BD) shown in FIG. 19.

As shown in FIG. 23, the occupied mark ratio difference ΔL is 0.04 between the mark levels of 1.00 and 0.91. Therefore, there is little margin in the precision for forming the mark ML. On the other hand, the occupied mark ratio difference ΔL is more than 0.1 between the mark levels of 0.40 and 0.66. Therefore, there is much margin in the precision for forming the mark ML.

An embodiment ③ is shown in FIG. 24. FIG. 24 shows the relation between the mark levels and the occupied mark ratios, in which the margin in the precision for forming the mark is raised for higher mark levels. In the FIG. 24, the occupied mark ratio difference ΔL is raised to about twice the occupied mark ratio difference ΔL as shown in FIG. 23 for higher mark levels. The minimum occupied mark ratio for the mark level of 0.80 is set to 0.12 in FIG. 24. The mark level of 1.00 is ruled out because there is no mark for the mark level of 1.00. As a result, 7 mark levels are equidistantly assigned between the mark level of 0.40 and 0.80 in FIG. 24. Therefore, the minimum occupied mark ratio for the cell, except for the cell without mark having the mark level of 1.00, can be set more than 0.1 so that the margin of ΔL is leveled and the deviation from the aimed multi-level signal can be reduced.

7. Embodiment ④ for Determining Levels of a Multi-Level Signal

Figure 21:
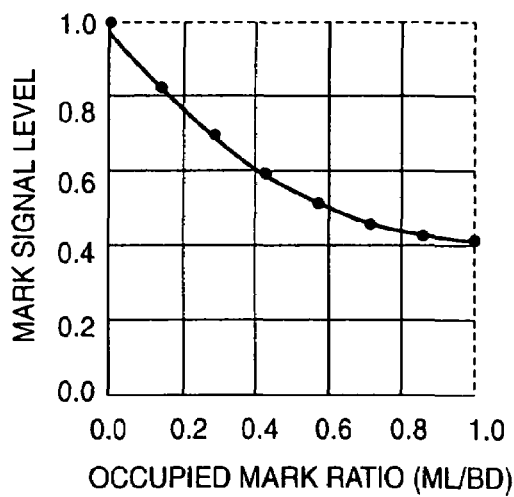
FIG. 21 shows a relation between an occupied MARK ratio and a MARK signal level of a multi level RF signal.
Figure 22:
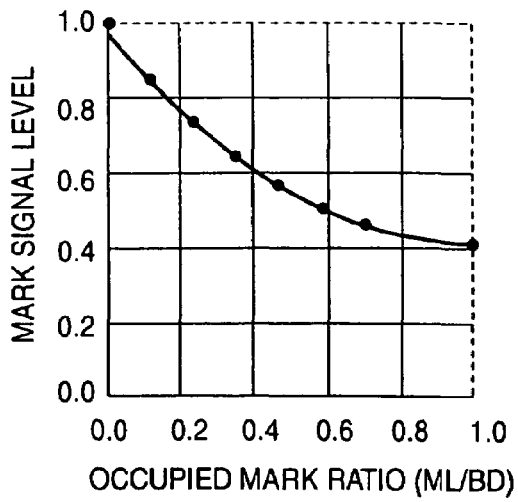
FIG. 22 shows a relation between an occupied MARK ratio and a MARK signal level of a multi level RF signal.

As mentioned above, in the embodiment ③, the method for enhancing the margin of ΔL, in which method the minimum occupied mark ratio for the mark level can be set more than 0.1 so that the margin of ΔL is leveled, is described. In this embodiment ④, a method for reducing the deviation of the multi-level signal from the aimed multi-level signal while the margin of ΔL is leveled, is described. Both FIG. 21 and FIG. 22 show the relation between the occupied mark ratio (ML/BD) and the mark signal level. An abscissa shows the occupied mark ratio (ML/BD) and an ordinate shows the mark signal level.

As shown in FIG. 21, each mark level of 8 mark levels is assigned so that the occupied mark ratio is between 0 to 1.0 and ΔL is equidistantly assigned. FIG. 25 shows the relation between the occupied mark ratios and the mark levels under the condition mentioned above in FIG. 21.

As shown in FIG. 25, the mark level difference ΔS is 0.01 between the occupied mark ratios of 0.71 and 1.00. There is little margin in the precision for forming the mark ML.

An embodiment ④ is shown in FIG. 26. FIG. 26 shows the relation between the occupied mark ratio and the mark level difference ΔS, in which the margin of ΔS is raised compared to FIG. 25.

As shown in FIG. 26, the maximum occupied mark ratio is set to 0.70. The mark level of 1.00 is ruled out because the cell is filled with the mark for the mark level of 1.00. As a result, 7 mark levels are equidistantly assigned between the occupied mark ratios of 0 and 0.70. Therefore, ΔS is leveled and the minimum value of ΔS is improved to 0.05.

As described above, the maximum occupied mark ratio can be set to 0.70 so that the margin of ΔS is leveled and the deviation of the multi-level signal from the aimed multi-level signal can be reduced.

The present invention is not limited to the specifically disclosed embodiments, and variations and modifications may be made without departing from the scope of the present invention.

The present application is based on Japanese priority application No.2001-036395 filed on Feb. 14, 2001, the entire contents of which are hereby incorporated by reference.

What is claimed is:

1. An optical information recording apparatus comprising:
   means for focusing a laser light to a laser spot to form a mark on an optical recording medium; and
   means for modulating a size of said mark according to a level of a multi-level signal that corresponds to information to be recorded, and
   wherein a strength of said laser light for recording each mark is modulated according to a waveform comprising a first rectangular erasing pulse signal, a rectangular recording pulse signal, an off-pulse signal and a second rectangular erasing pulse signal,
   said laser light having a strength set to a value indicated by said first rectangular erasing pulse signal can erase a recorded mark,
   said laser light having a strength set to a value indicated by said rectangular recording pulse signal can record a mark,
   a strength of said laser light set to a value indicated by said off-pulse signal is less than a strength of said laser light used in reproduction of said recorded marks,
   said laser light having a strength set to a value indicated by said second rectangular erasing pulse signal can erase said recorded mark, and
   a product of the time interval of said rectangular recording pulse signal and a relative linear velocity between said laser spot and said medium is shorter than a length of said recorded mark, and
   wherein a length of said rectangular recording pulse signal is set to a predetermined constant value and a length of said off-pulse signal is adjusted according to said multi-level signal.

2. The apparatus of claim 1, wherein a size of said mark is modulated according to said information by means of modulating a pulse width of said off-pulse signal so that a time interval between a rising edge of said rectangular recording pulse signal and a rising edge of said rectangular erasing pulse signal corresponds to said size of said mark.

3. The apparatus of claim 1, wherein said apparatus is arranged such that a center of said mark is placed at a center of a cell by means of adjusting both a rising edge of said rectangular recording pulse signal and a rising edge of said rectangular erasing pulse signal.

4. The apparatus of claim 2, wherein said apparatus is arranged such that a center of said mark is placed at a center of said cell by means of adjusting both said rising edge of said rectangular recording pulse signal and said rising edge of said rectangular erasing pulse signal.

5. The apparatus of claim 1, further comprising means for controlling timing of a falling edge of said rectangular recording pulse signal.

6. The apparatus of claim 2, wherein said size of said mark is fine-adjusted by controlling timing of a falling edge of said rectangular recording pulse signal.

7. The apparatus of claim 3, wherein said apparatus is arranged such that said size of said mark is fine-adjusted by controlling timing of a falling edge of said rectangular recording pulse signal.

8. The apparatus of claim 4, wherein said size of said mark is fine-adjusted by controlling timing of a falling edge of said rectangular recording pulse signal.

9. The apparatus of claim 1, further comprising means for controlling said strength of said laser light.

10. The apparatus of claim 2, wherein said size of said mark is fine-adjusted by controlling said strength of said laser light.

11. The apparatus of claim 3, wherein said apparatus is arranged such that the size of said mark is fine-adjusted by controlling said strength of said laser light.

12. The apparatus of claim 4, wherein said size of said mark is fine-adjusted by controlling said strength of said laser light.

13. The apparatus of claim 5, wherein said apparatus is arranged such timing of a rising edge of said rectangular recording pulse signal is controlled so that a center of said mark is placed at a center of a cell.

14. An apparatus for recording information on a medium, said apparatus comprising:
    a source of laser light; and
    a modulator for modulating a size of a mark according to a level of a multi-level signal that corresponds to information to be recorded, and
    wherein a strength of said laser light is modulated according to a waveform comprising a first rectangular erasing pulse signal, a rectangular recording pulse signal, an off-pulse signal and a second rectangular erasing pulse signal,
    said laser light having a strength set to a value indicated by said first rectangular erasing pulse signal can erase a recorded mark,
    said laser light having a strength set to a value indicated by said rectangular recording pulse signal can record a mark,
    a strength of said laser light set to a value indicated by said off-pulse signal is less than a strength of said laser light used in reproduction of said recorded marks,
    said laser light having a strength set to a value indicated by said second rectangular erasing pulse signal can erase said recorded mark, and
    a product of the time interval of said rectangular recording pulse signal and a relative linear velocity between a laser spot and said medium is shorter than a length of said recorded mark.

15. The apparatus of claim 14, wherein said apparatus is arranged such that a relation between the length (ML) of said mark along a track and a diameter (BD) of said laser spot satisfies $ML \leq BD$, and a product of the pulse width of said rectangular recording pulse signal and said relative linear velocity is less than 20% of said diameter (BD) of said laser spot.

16. The apparatus of claim 14, wherein a relation between a length of a minimum mark (MLmin) along said track except when there is no mark and a diameter (BD) of said laser spot satisfies $MLmin/BD \geq 0.10$, and each level of said multi-level signal is assigned so that the level difference between adjacent levels becomes equidistant except when there is no mark.

17. The apparatus of claim 14, wherein said apparatus is arranged such that a relation between a length of a maximum mark (MLmax) along said track, except for a mark that has about the same length as a diameter of said laser spot, and a diameter (BD) of said laser spot satisfies $MLmax/BD \leq 0.70$, and each occupied mark ratio of said multi-level signal is assigned so that the difference between said occupied mark ratios corresponding to adjacent levels of said multi-level signal becomes equidistant except for said mark that has about the same length as said diameter of said laser spot.

* * * * *